United States Patent
Hauptvogel et al.

(10) Patent No.: US 11,428,597 B2
(45) Date of Patent: Aug. 30, 2022

(54) METHOD FOR DIAGNOSING A SUPERCHARGED INTERNAL COMBUSTION ENGINE FOR LEAKAGE IN A PORTION OF THE INTAKE AIR LINE

(71) Applicant: VOLKSWAGEN AKTIENGESELLSCHAFT, Wolfsburg (DE)

(72) Inventors: Mathias Hauptvogel, Weferlingen (DE); Fabian Berski, Hannover (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 374 days.

(21) Appl. No.: 16/690,868

(22) Filed: Nov. 21, 2019

(65) Prior Publication Data
US 2020/0158590 A1 May 21, 2020

(30) Foreign Application Priority Data

Nov. 21, 2018 (DE) ...................... 10 2018 219 970.1

(51) Int. Cl.
*G01M 3/02* (2006.01)
*F02D 41/22* (2006.01)
(Continued)

(52) U.S. Cl.
CPC ............. *G01M 3/025* (2013.01); *F02B 37/00* (2013.01); *G01M 3/26* (2013.01)

(58) Field of Classification Search
CPC .......... G01M 3/00; G01M 3/02; G01M 3/025; G01M 3/26; F02B 37/00
See application file for complete search history.

(56) References Cited

U.S. PATENT DOCUMENTS

2002/0088438 A1   7/2002   Pfitz
2003/0209236 A1   11/2003  Bergmann et al.
(Continued)

FOREIGN PATENT DOCUMENTS

CN   102057147 A   5/2011
CN   106150730 A   11/2016
(Continued)

OTHER PUBLICATIONS

Office Action for Chinese Patent Application No. 201911125490.7, dated Jan. 4, 2022.

*Primary Examiner* — Nguyen Q. Ha
(74) *Attorney, Agent, or Firm* — Pearl Cohen Zedek Latzer Baratz LLP

(57) ABSTRACT

A method for diagnosing a combustion machine, wherein the combustion machine comprises at least one internal combustion engine and one intake air line via which fresh air can be fed to the internal combustion engine. In addition, at least one intake air compressor and, upstream from the intake air compressor, a control flap are integrated into the intake air line. In one operating state of the combustion machine, the control flap is closed so far that a negative pressure relative to the ambient pressure is produced by means of the running internal combustion engine in the portion of the intake air line that lies between the control flap and the internal combustion engine, with an actual value that is associated with this negative pressure being compared with a target value and the presence or absence of leakage in this portion of the intake air line being deduced from any difference that might exist between the actual value and the target value.

8 Claims, 1 Drawing Sheet

(51) Int. Cl.
*F02B 37/00* (2006.01)
*G01M 3/26* (2006.01)

(56) References Cited

U.S. PATENT DOCUMENTS

| | | |
|---|---|---|
| 2004/0139796 A1 | 7/2004 | Beyer et al. |
| 2009/0151696 A1 | 6/2009 | Graupner et al. |
| 2010/0146966 A1 | 6/2010 | Burkhardt et al. |
| 2010/0236218 A1 | 9/2010 | De Tricaud et al. |
| 2013/0269662 A1 | 10/2013 | Kuhn et al. |
| 2016/0222925 A1 | 8/2016 | Baeuerle |
| 2017/0032881 A1 | 11/2017 | Yaeo |

FOREIGN PATENT DOCUMENTS

| | | | |
|---|---|---|---|
| CN | 107842432 A | 3/2018 | |
| CN | 108026840 A | 5/2018 | |
| DE | 10065474 C1 | 6/2002 | |
| DE | 19628235 C2 | 4/2003 | |
| DE | 10209870 A1 | 9/2003 | |
| DE | 10300592 A1 | 7/2004 | |
| DE | 10 2004 036 064 A1 | 3/2006 | |
| DE | 10 2005 024 984 A1 | 12/2006 | |
| DE | 10 2005 043 736 A1 | 3/2007 | |
| DE | 10 2005 060 350 A1 | 6/2007 | |
| DE | 10 2007 023 559 B3 | 12/2008 | |
| DE | 10 2007 052 576 A1 | 5/2009 | |
| DE | 10 2009 027 519 | 9/2010 | |
| DE | 10 2011 017 577 | 10/2012 | |
| DE | 10 2011 086 361 A1 | 5/2013 | |
| DE | 10 2013 218 612 A1 | 3/2015 | |
| DE | 10 2014 012 859 B3 | 1/2016 | |
| DE | 102014012859 B3 * | 1/2016 | ............. F02D 21/08 |
| DE | 10 2015 202 180 A1 | 8/2016 | |
| DE | 10 2016 217 921 A1 | 3/2018 | |
| DE | 102016217921 A1 * | 3/2018 | ............. F02D 41/22 |
| EP | 1193388 A2 | 4/2002 | |
| FR | 2985544 A3 | 7/2013 | |
| GB | 2558604 A * | 7/2018 | ............. F02B 37/00 |
| WO | WO 2006/114393 A1 | 11/2006 | |
| WO | WO 2009/150057 A1 | 12/2009 | |
| WO | WO 2018/131152 A1 | 7/2018 | |
| WO | WO-2019149506 A1 * | 8/2019 | ......... F02D 41/1454 |

* cited by examiner

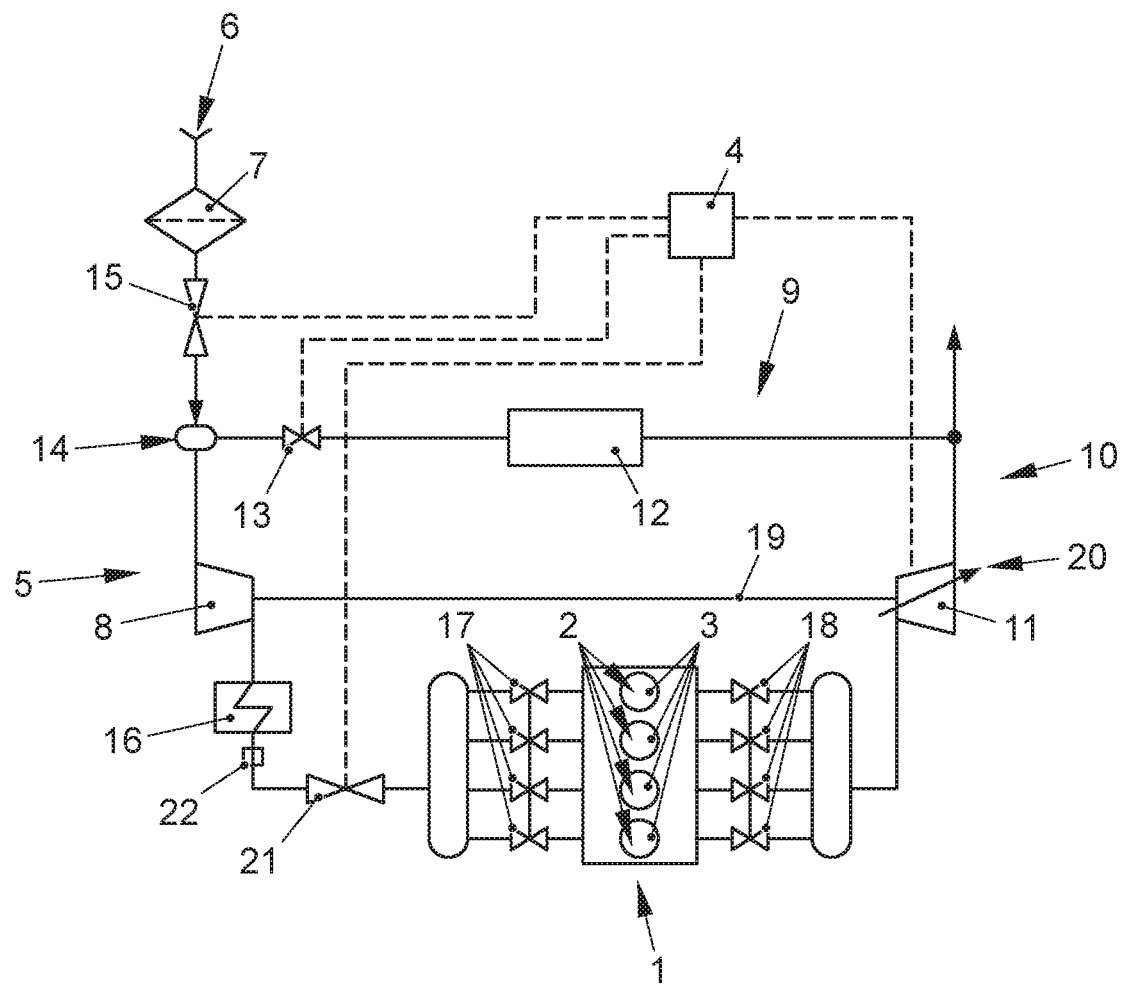

METHOD FOR DIAGNOSING A SUPERCHARGED INTERNAL COMBUSTION ENGINE FOR LEAKAGE IN A PORTION OF THE INTAKE AIR LINE

CROSS REFERENCE TO RELATED APPLICATION

This application claims priority from German Patent Application No. 10 2018 219 970.1, filed Nov. 21, 2018, which is hereby incorporated by reference in its entirety.

FIELD OF THE INVENTION

The invention relates to a method for diagnosing a supercharged combustion machine for leakage in a portion of the intake air line.

BACKGROUND OF THE INVENTION

Combustion machines that are intended for driving motor vehicles are usually supercharged in order to increase specific power output and to reduce specific fuel consumption. It is common practice to supercharge combustion machines by means of one or more exhaust gas turbochargers. These include an exhaust turbine having a turbine rotor wheel that is flowed against with exhaust gas that has been discharged from an internal combustion engine of the combustion machine and thereby caused to rotate. Via a shaft, the turbine rotor wheel drives a compressor wheel of an intake air compressor that is integrated into an intake air line of the internal combustion engine, thereby compressing the intake air. Alternatively, such an intake air compressor can also be driven by means of another drive, for example by the internal combustion engine itself or by means of an electric drive motor. The compression enables the amount of intake air that is introduced into the combustion chambers of the combustion engine and hence the quantities of the fuel that can be converted in the combustion chambers in a respective operation cycle to be increased.

The drive speed of a compressor wheel depends not only on the drive power that is provided for this purpose but also on the driving resistance. This driving resistance, in turn, depends directly on the boost pressure in the charge air path, i.e., on the pressure of the intake air in that portion of the intake air line that is located between the intake air compressor and the internal combustion engine. A limitation of the operating speed of the intake air compressor (and thus also of an associated exhaust turbine in the case of an exhaust gas turbocharger) to an allowable maximum speed therefore requires in principle that a defined operating state of the combustion machine result in a defined boost pressure inter alia at a specific drive speed. Such a relationship can be adequately derived if the charge air path is sufficiently airtight. If such airtightness is not sufficiently provided, this leads to a pressure loss and thus to a reduction in the driving resistance, which can then result in an overshooting of a permissible maximum speed of the intake air compressor.

In principle, it is possible to identify leakage in the charge air path of an intake air line of a combustion machine by measuring the pressure and comparing a measured actual value with a defined target value. However, this is inherently possible only in an operating state in which a boost pressure is actually generated by means of the compressor. The problem here is that many combustion machines that are used for driving motor vehicles are very often not operated in such operating conditions in which there is a (high) boost pressure. Furthermore, such an approach only enables leakage in the charge air path of the intake air line to be identified.

DE 10 2005 024 984 A1 describes a combustion machine having an internal combustion engine, an intake air line, an intake air compressor that is integrated into the intake air line, an exhaust system, an exhaust aftertreatment device that is integrated into the exhaust system, high-pressure exhaust gas recirculation, low-pressure exhaust gas recirculation, and a respective throttle valve that is integrated into the intake air line upstream from the respective exhaust gas recirculation. During warm-up and/or low-load operation of the combustion machine, the amount of fresh air that is supplied by the intake air line to the internal combustion engine is throttled by means of the throttle valve in order to increase the exhaust gas temperature in the exhaust system and thus improve the efficiency of the exhaust aftertreatment system.

DE 10 2005 060 350 A1 discloses a method for controlling a combustion process of a combustion machine with exhaust gas recirculation whose internal combustion engine can be operated with different air-fuel ratios. Both the amount of fresh air and the recirculated exhaust gas flow are selectively metered in order to allow precise determination of the exhaust gas recirculation rate with low error tolerance.

DE 10 2015 202 180 A1 also describes a method by means of which the quantity of air supplied to an internal combustion engine that is operated with exhaust gas recirculation is regulated.

It was the object of the invention to specify an advantageous possibility for diagnosing a combustion machine for the presence or absence of leakage in the intake air line.

SUMMARY OF THE INVENTION

This object is achieved by means of a method according to the claims. Advantageous embodiments of the method according to the invention constitute the subject matter of the other claims and/or become apparent from the following description of the invention.

According to the invention, a method for diagnosing a combustion machine is provided in which the combustion machine comprises at least one internal combustion engine (particularly a (self-ignited and quality-controlled) diesel engine or a (self-ignited and quantity-controlled) gasoline engine or a combination thereof—e.g., an internal combustion engine with homogeneous compression ignition) and an intake air line via which the internal combustion engine can be supplied with fresh air. In addition, at least one intake air compressor and—upstream from the intake air compressor (relative to a flow of fresh air in the direction of the internal combustion engine)—one control flap is integrated into the intake air line. In one operating state of the combustion machine, the control flap is closed so far (partially or completely or to the greatest possible extent) that a negative pressure relative to the ambient pressure is produced by means of the running internal combustion engine in the portion of the intake air line that lies between the control flap and the internal combustion engine, with a (measured) actual value that is associated with this negative pressure being compared with a target value and the presence or absence of leakage in this portion of the intake air line being deduced from any difference that might exist between the actual value and the target value. A provision can be made that, for a specific set position of the control flap, a measured actual pressure value is compared with a target pressure value, and any difference that is observed between this (optionally greater absolute) actual pressure value and the (optionally lesser absolute) target pressure value above a threshold value is identified as leakage. A provision can also be made for the extent of the leakage to be derived from the magnitude of this difference. As an alternative, it is advantageously possible to compare an actual position of the control flap (in which it is closed to a greater extent, for instance) with a target position of the control flap (in which it is closed to a lesser extent, for instance) when a negative pressure is set to a defined pressure value, in which case a difference between this actual position and the target position above a threshold value is identified as leakage. A provision can also be made that a specific extent of the leakage or a specific measure of the leakage is derived from this difference.

According to the invention, the term "control flap" refers to any actively controllable valve by means of which a quantitative influence can be exercised over a gas flow that is flowing in the intake air line and conducted via this control flap. The control flap can be preferably instantiated as a check valve, but it can also have other configurations.

Preferably, a provision can be made that a method according to the invention or the generation of the negative pressure is performed when the combustion machine is in an operating state in which no boost pressure generation is occurring by means of the intake air compressor, because the intended negative pressure can then be generated relatively quickly by closing the control flap, and the negative pressure can also become relatively high. This enables both the speed at which a determination result can be achieved and the accuracy of the determination result to be positively influenced. An operating state of the combustion machine without boost pressure generation by the intake air compressor is characterized in that there is no higher intake air pressure on the outlet side compared to the inlet side of the intake air compressor. Such an operating state is instantiated particularly by an overrun mode of the combustion machine in which the internal combustion engine does not transmit drive energy but rather absorbs it, and by an idling mode in which the internal combustion engine provides drive energy at a minimum rpm, but the drive energy is not tapped. Implementation in a low load range during operation of the internal combustion engine with a correspondingly low intake manifold pressure is also possible.

Preferably, when a request is made for the diagnosis, which may been done particularly by means of a control device of the combustion machine, the execution of a method according to the invention or the generation of the negative pressure is postponed until an operating state of the combustion machine is reached without further request (i.e., not as a result of an active setting for the exclusive purpose of the diagnosis) in which there is no generation of boost pressure. Consequently, the implementation of a method according to the invention is then postponed until the combustion machine is operated in a corresponding operating state as a result of a corresponding use by an operator, particularly a driver of a motor vehicle that comprises the combustion machine. This makes it possible to prevent the performance characteristics from being adversely influenced as a result of an actively set operating state (particularly by means of the control device) without boost pressure generation that does not actually correspond to the operating state requested by the operator of the combustion machine. Optionally, however, such active setting of an operating state of the combustion engine without boost pressure generation can also be provided for.

A method according to the invention can also be advantageously used in a combustion machine in which an exhaust gas recirculation line discharges into the intake air line and exits through the exhaust line via which exhaust gas can be discharged from the internal combustion engine. However, an exhaust gas recirculation valve that is integrated into the exhaust gas recirculation line should be kept closed at least partially, preferably completely during the generation of the negative pressure in order not to hamper the generation of negative pressure due to the inflow of exhaust gas that is returned via the exhaust gas recirculation line and to prevent a falsification of the determination result as a result of recirculated exhaust gas.

On the one hand, the exhaust gas recirculation line can be provided for the purpose of high-pressure exhaust gas recirculation, in which the recirculated exhaust gas is introduced into the intake air line downstream from the intake air compressor (with respect to the flow of fresh air in the intake air line in the direction of the internal combustion engine) and optionally—i.e., in one embodiment of the intake air compressor as part of an exhaust gas turbocharger—branched off from the intake air line upstream from an exhaust gas turbine that is integrated into the exhaust turbine of the exhaust gas turbocharger (with respect to the flow of the exhaust gas in the exhaust system coming from the internal combustion engine). On the other hand, the exhaust gas recirculation line can also be provided for low-pressure exhaust gas recirculation, in which the recirculated exhaust gas is introduced into the intake air line upstream from the intake air compressor and optionally branched off downstream from the exhaust turbine integrated into the exhaust system. It is also possible in principle for at least two exhaust gas recirculation lines to be provided, at least one of which is used for high-pressure exhaust gas recirculation and at least one of which is used for low-pressure exhaust gas recirculation.

Preferably, a provision can be made that the exhaust gas recirculation line or at least one of the exhaust gas recirculation lines discharges into a portion of the intake air line lying between the control flap and the intake air compressor and can therefore be used particularly for low-pressure exhaust gas recirculation. A provision can also be made that this exhaust gas recirculation line discharges into the intake air line immediately downstream and, in particular, at a minimum distance from the control flap, whereby it can be used additionally or primarily to generate local negative pressure in the vicinity of the opening of the exhaust gas recirculation line during operation of the combustion machine in order to ensure sufficient flow of recirculating exhaust gas via the exhaust gas recirculation line.

A method according to the invention can also be advantageously used in a combustion machine in which a throttle valve is integrated into the portion of the intake air line lying between the intake air compressor and the internal combustion engine. A provision should be made, however, that the throttle valve is kept at least partially, preferably completely open or as far open as possible during the generation of the negative pressure in order to enable the negative pressure to be generated by means of the running internal combustion engine even in the portion of the intake air line lying between the control flap and the throttle valve.

In an embodiment of the internal combustion engine as a gasoline engine, this throttle valve can be used in particular to control the amount of fresh air supplied to the combustion chamber(s) of the internal combustion engine (i.e., for quantitative regulation of the gasoline engine). In an embodiment of the internal combustion engine as a diesel engine, the at least primary function of the throttle valve can consist in closing the charge air path shortly after termination of the operation of the diesel engine, whereby already compressed fresh air can be prevented from flowing subsequently into combustion chamber(s) of the diesel engine. This is intended to prevent unintentional afterrunning of the diesel engine as a result of autoignition of fuel residues in the combustion chambers in the presence of subsequently flowing fresh air. If an exhaust gas recirculation line for high-pressure exhaust gas recirculation is also present in a combustion machine according to the invention with throttle valve, the throttle valve could also be used to influence the exhaust gas recirculation rate.

If leakage is identified in the intake air line during the implementation of a method according to the invention, an error entry can be preferably generated in an error memory, for example in an error memory of an engine control of the combustion machine. This error entry can then be read out again immediately or at a later time in order to initiate measures for correcting the leakage and/or for compensating for the effects of the leakage.

Especially preferably, a provision can be made for measures to limit the drive speed of the intake air compressor to be initiated upon detection of leakage. For example, these measures can include setting a device for variable inflow at the intake air compressor and/or a device for variable admission flow at an exhaust gas turbine (VTG) and/or at a wastegate valve such that it generates or they generate a lower compression power upon detection of leakage than would be the case if no leakage were detected.

A particular advantage of the method according to the invention is that it is practicable and provides a good diagnostic result even if the leakage is so small that its effect could/would be compensated for automatically during normal operation of the combustion machine by means of one or more boost pressure regulators, particularly by means of a VTG and/or wastegate valve.

A combustion machine that is used in the context of a method according to the invention may, in particular, be part of a motor vehicle, particularly a wheel-based and non-railbound motor vehicle, preferably a car or a truck. In this case, the combustion machine can be provided in particular for the direct or indirect provision of the drive power for the motor vehicle.

Particularly in the claims and in the description, which provides a general description of the claims, the indefinite articles ("a" and "an") are to be understood as such and not as quantifiers. Accordingly, components that are qualified therewith are thus to be understood as being present at least singly and possibly in a plurality.

BRIEF DESCRIPTION OF THE DRAWINGS

In the following, the invention will be explained in further detail on the basis of the exemplary embodiment illustrated in the drawing. In the drawing:

FIG. 1 shows a schematic representation of a combustion machine that is suitable for carrying out a method according to the invention.

DETAILED DESCRIPTION OF THE INVENTION

The combustion machine shown in FIG. 1 comprises an internal combustion engine 1 that comprises a plurality of cylinders 2. Together with vertically guided pistons 3 and a cylinder head (not shown), the cylinders 2 form combustion chambers in which fresh air is combusted together with fuel. In the process, the fuel is injected directly into the combustion chambers under the control of a control device 4 (engine control) by means of injectors (not shown). The burning of the fuel-intake air mixtures results in cyclical up-and-down movements of the piston 3, which, in turn, are transmitted in a known manner via connecting rods (not shown) to a crankshaft (also not shown), whereby the crankshaft is caused to rotate.

The intake air is supplied to the internal combustion engine 1 via an intake air line 5. For this purpose, air is sucked in from the environment via an intake opening 6, whereupon it is cleaned in an air filter 7 and then conducted to an intake air compressor 8, which is part of an exhaust gas turbocharger. Beforehand, the air can be mixed with exhaust gas that has been passed through an exhaust gas recirculation line 9 in order to achieve low-pressure exhaust gas recirculation, whereby the intake air compressor 8 is supplied with intake air that is a mixture of air and recirculated exhaust gas. The exhaust gas recirculation line 9 branches off from an exhaust line 10—specifically downstream from an exhaust gas turbine 11 that is integrated into this exhaust line 10 and is also part of the exhaust gas turbocharger—and flows into the intake air line 5 upstream from the intake air compressor 8. An exhaust gas cooler 12 and an exhaust gas recirculation valve 13 that can be actuated by means of the control device 4 is additionally integrated into the exhaust gas recirculation line 9. By means of the exhaust gas cooler 12, the recirculated exhaust gas can be cooled in order, inter alia, to keep the thermal load of the intake air compressor 8 low. The amount of exhaust gas that is conducted via the exhaust gas recirculation line 9 can be influenced or controlled by means of the exhaust gas recirculation valve 13.

In order to enable an adequate pressure gradient to be set across the exhaust gas recirculation line 9 at any time during operation of the combustion machine, a control flap 15 is integrated into a portion of the intake air line 5 that is located between the air filter 7 and the outlet 14 of the exhaust gas recirculation line 9 that is also controlled by means of the control device 4. Through increasing closure of this control flap 15, whereby it makes the free flow cross section of the intake air line 5 there increasingly smaller, a negative pressure can be generated in the region downstream from the control flap 15 and hence in the vicinity of the outlet 14 of the exhaust gas recirculation line 9 that particularly ensures an adequate pressure gradient over the exhaust gas recirculation line 9 even when no or only slight boost pressure is generated by the intake air compressor 8 in the charge air path (i.e., in the portion of the intake air line 5 that is located between the intake air compressor 8 and the internal combustion engine 1) with the corresponding suction effect on the upstream side of the intake air compressor 8.

The intake air is compressed by means of the intake air compressor 8, whereupon it is cooled in a charge air cooler 16 and then fed to the combustion chambers under the control of intake valves 17. The intake air compressor 8 is driven by means of the exhaust turbine 11. Exhaust gas that was produced during the combustion of the fuel-intake air mixtures in the combustion chambers of the internal combustion engine 1 is discharged from the internal combustion engine 1 and via the exhaust system 10 under the control of exhaust valves 18. The exhaust gas flows through the exhaust turbine 11. This leads in a known manner to a rotational driving of a turbine rotor wheel (not shown) of the exhaust turbine 11, which is non-rotatably connected by means of a shaft 19 to a compressor wheel (not shown) of the air compressor 8.

In order to achieve the best possible utilization of the enthalpy of the exhaust gas by means of the exhaust gas turbocharger during operation of the internal combustion engine 1 under varying loads and at varying speeds, the exhaust turbine 11 can comprise a device for variable turbine admission flow (VTG) 20 that is controllable by means of the control device 4. In a known manner, the latter can comprise a plurality of guide vanes that are arranged in an inlet channel of the exhaust gas turbine 11, the guide vanes being designed to be individually rotatable and being collectively adjustable by means of an adjusting device. Depending on the rotational positions of the guide vanes, these narrow the free flow cross section in an inlet channel of the exhaust turbine 11 to a greater or lesser extent and also influence the portion of the primary admission flow of the turbine rotor wheel and the orientation of this admission flow. Alternatively, however, the exhaust turbine can also be designed without VTG and with or without wastegate.

A throttle valve 21 that can also be controlled by means of the control device 4 is integrated into the charge air path of the intake air line 5 downstream from the intake air compressor 8 and charge air cooler 16.

In order to check the intake air line 5 and, specifically, the portion of the intake air line 5 that lies between the control flap 15 and the intake valves 17 of the internal combustion engine 1 for the presence of leakage, a provision is made according to the invention that, upon a request of such a diagnosis by means of the control device 4—which can be provided for once after each startup of the combustion machine, for example—the control flap 15 is closed in an operating state of the combustion machine without boost pressure generation by means of the intake air compressor 8, particularly during an idle or overrun mode of the internal combustion engine 1, far enough that a negative pressure relative to the ambient pressure is produced by the still-running internal combustion engine 1 in said portion. This generation of a negative pressure is based on the function of the internal combustion engine caused by the cyclical movement of the pistons 3 and the cyclical opening and closing of the intake valves 17 and exhaust valves 18, to suck in fresh air from the intake air line 5 and to discharge it into the exhaust line 10, which occurs even when the internal combustion engine 1 is being operated in overrun mode, in which no intake air-fuel mixtures are burned in the combustion chambers.

Such a diagnosis can also be initiated passively, meaning in such a way that it is requested non-actively by the control unit based on the presence of certain parameters. In that case, the corresponding operating state of the combustion machine can be set stochastically in particular.

During this generation of a negative pressure, the exhaust gas recirculation valve 13 is completely closed in order to prevent recirculation of exhaust gas via the exhaust gas recirculation line 9, which would otherwise counteract the intended generation of a negative pressure in the intake air line 5. If the internal combustion engine 1 has a functionality for a partial operation in which it can basically be operated with only a portion of the total available combustion chambers (so-called cylinder deactivation), a provision should also be made to deactivate this functionality in order to maximize the suction effect of the internal combustion engine 1.

Depending on the specific closed position of the control flap 15 that is set and the operating speed of the internal combustion engine 1, a defined value or range of values for the (negative) pressure in said portion of the intake air line 5 should have been reached after a defined period of time, which is stored in the control device 4 as a target value. If this target value is at least approximately reached, which is measured by means of at least one integrated pressure sensor 22 in the abovementioned portion of the intake air line 5 (determination of an actual value), it is assumed that there is no leakage in that portion of the intake air line 5. The diagnosis is thus terminated, optionally after this diagnostic result is stored in the control device 4.

If, on the other hand, the target value is not reached or the determined actual value differs from the target value to a greater extent than specified by a tolerance difference, it is assumed that there is leakage from the intake air line 5 in said portion, and a corresponding error entry is stored in the control device 4. This error entry can then be read out as part of the maintenance of the combustion machine or of a motor vehicle comprising the combustion machine and serve as an instigation for a repair of the intake air line 5. In addition, a provision can be made for a switch to an emergency operation program by means of the control device 4 for operation of the combustion machine after the diagnosis through provision of measures by means of which an overshoot of a permissible maximum speed of the intake air compressor 8 and/or exhaust gas turbocharger is avoided. In order to avoid exceeding a permissible maximum speed of the exhaust gas turbocharger, it is possible to provide, inter alia, a modified control of the VTG 16 (or of a wastegate valve) with the aim of at least temporarily reduced utilization of the available exhaust gas enthalpy in the exhaust turbine.

LIST OF REFERENCE SYMBOLS

1 internal combustion engine
2 cylinder
3 piston
4 control device
5 intake air line
6 admission port
7 air filter
8 intake air compressor
9 exhaust gas recirculation line
10 exhaust line
11 exhaust turbine
12 exhaust gas cooler
13 exhaust gas recirculation valve
14 outlet of the exhaust gas recirculation line
15 control flap
16 charge air cooler
17 intake valve
18 exhaust valve
19 shaft
20 variable turbine admission flow device (VTG)
21 throttle valve
22 pressure sensor

The invention claimed is:

1. A method for diagnosing a combustion machine having an internal combustion engine and an intake air line via which the internal combustion engine can be supplied with fresh air, wherein an intake air compressor is integrated into the intake air line and a control flap is integrated upstream from the intake air compressor, the method comprising:

closing the control flap to the extent that a negative pressure is generated by the running internal combustion engine in the portion of the intake air line lying between the control flap and the internal combustion engine relative to the ambient pressure, comparing an actual value associated with this negative pressure with a target value, deducing a presence or absence of leakage in this portion of the intake air line from a difference between the actual value and the target value, and initiating measures to limit the drive speed of the intake air compressor upon detection of leakage.

2. The method as set forth in claim 1, further comprising comparing an actual pressure value with a target pressure value when the control flap is in a defined position, or comparing an actual position of the control flap with a target position of the control flap when the set pressure is at a defined pressure value.

3. The method as set forth in claim 1, wherein said method is implemented in an operating state of the combustion machine without boost pressure generation by means of the intake air compressor.

4. The method as set forth in claim 3, further comprising, when a request is made for the diagnosis, postponing execution of the method until an operating state of the combustion machine is reached without further request in which there is no generation of boost pressure by means of the intake air compressor, or, when a request is made for the diagnosis, actively setting an operating state of the combustion machine without boost pressure by means of the intake air compressor.

5. The method as set forth in claim 1, wherein, in said combustion machine, an exhaust gas recirculation line discharges into the intake air line and exits through an exhaust line via which exhaust gas can be discharged from the internal combustion engine, and an exhaust gas recirculation valve that is integrated into the exhaust gas recirculation line being kept at least partially closed during the generation of the negative pressure.

6. The method as set forth in claim 5, wherein, in said combustion machine, the exhaust gas recirculation line discharges into a portion of the intake air line lying between the control flap and the intake air compressor.

7. The method as set forth in claim 1, wherein, in said combustion machine, a throttle valve is integrated into the portion of the intake air line lying between the intake air compressor and the internal combustion engine, the throttle valve being kept at least partially open during the generation of the negative pressure.

8. The method as set forth in claim 1, further comprising generating an error entry in an error memory upon detection of leakage.

* * * * *